United States Patent
Yen et al.

(10) Patent No.: US 8,447,966 B2
(45) Date of Patent: May 21, 2013

(54) PERIPHERAL CONTROL MODULE, COMPUTER SYSTEM, AND OPERATION METHOD THEREOF

(75) Inventors: Hung-Wei Yen, Taipei (TW); Hui-Shan Wang, Taipei (TW); Yu-Chi Kao, Taipei (TW)

(73) Assignee: Pegatron Corporation, Beitou District, Taipei (TW)

( * ) Notice: Subject to any disclaimer, the term of this patent is extended or adjusted under 35 U.S.C. 154(b) by 466 days.

(21) Appl. No.: 12/820,115

(22) Filed: Jun. 21, 2010

(65) Prior Publication Data
US 2010/0332815 A1    Dec. 30, 2010

(30) Foreign Application Priority Data
Jun. 26, 2009   (TW) ............................... 98121600 A

(51) Int. Cl.
*G06F 1/24*   (2006.01)

(52) U.S. Cl.
USPC .......................................... 713/100

(58) Field of Classification Search
USPC .......................................... 713/100
See application file for complete search history.

(56) References Cited

U.S. PATENT DOCUMENTS

| | | | |
|---|---|---|---|
| 4,282,574 A * | 8/1981 | Yoshida et al. | 701/113 |
| 4,614,880 A * | 9/1986 | Go et al. | 327/143 |
| 4,916,474 A * | 4/1990 | Miyazawa et al. | 396/280 |
| 7,055,064 B2 | 5/2006 | Lin | |
| 7,159,107 B2 | 1/2007 | Chen | |
| 7,421,588 B2 * | 9/2008 | Challener et al. | 713/193 |

FOREIGN PATENT DOCUMENTS

| | | | |
|---|---|---|---|
| CN | 1193135 A | 9/1998 |
| CN | 1286427 A | 3/2001 |
| CN | 1787373 A | 6/2006 |

\* cited by examiner

*Primary Examiner* — Kim Huynh
*Assistant Examiner* — Eric Chang
(74) *Attorney, Agent, or Firm* — Winston Hsu; Scott Margo

(57) ABSTRACT

This invention provides a peripheral control module, a computer system, and an operation method thereof. The peripheral control module is for a computer system. The computer system includes a power switch capable of outputting a power signal. The peripheral control module includes a control unit and a control circuit. The control unit has a program code for controlling a peripheral module. The control circuit is coupled with the power switch and the control unit for receiving the power signal and outputting a switching signal to the control unit, and the control circuit resets the program code to an initial state before the control unit receives the switching signal. This invention further provides a computer system using the peripheral control module and an operation method thereof.

13 Claims, 5 Drawing Sheets

PERIPHERAL CONTROL MODULE, COMPUTER SYSTEM, AND OPERATION METHOD THEREOF

CROSS-REFERENCE TO RELATED APPLICATIONS

This Non-provisional application claims priority under 35 U.S.C. §119(a) on Patent Application No(s). 098121600 filed in Taiwan, Republic of China on Jun. 26, 2009, the entire contents of which are hereby incorporated by reference.

BACKGROUND OF THE INVENTION

1. Field of the Invention

This invention relates to a startup program of a computer system and, more particularly, to hardware capable of solving a problem that a computer system fails to be restarted after shutdown and an operation method thereof.

2. Description of the Related Art

An industrial personal computer (IPC) is derived from industrial automation. The industrial personal computer is mainly for a programmable logic controller (PLC) of a factory automatic device and is responsible for control, monitor, and test in a manufacturing flow path. Therefore, the industrial personal computer is called.

With standardization and decrease of a price of a Wintel personal computer (PC), an automatic control system gradually uses a PC as a platform, such that standard personal computers have gradually become a main stream of the industrial automation. Further, as the personal computer is used, the industrial personal computer can leave the original industrial field for different fields for designing. Therefore, the industrial personal computers applied to different kinds of fields are generated.

With development of 3C and the Internet, the industrial personal computer is also for an information application, a communication application, a consuming electronic application, a photoelectric application, a semiconductor application, and a software application. The application field of the industrial personal computer has continuously enlarged, and it has gradually enlarged from the industrial field to our life. Currently speaking, a card reader of a chip card, an automatic teller machine (ATM), a ticket vendor, a lottery machine, a gaming machine, a large recreational game machine, a security monitoring device, a medical device, a digital signage and so on may be new applications of the industrial personal computer.

With difference of the application fields, the industrial personal computer has a highly customized guidance, such that the industrial personal computer has become a product with variety. With difference of the application fields, a program code of an embedded control unit in the industrial personal computer for controlling a peripheral module may be different with the characteristics of the products.

However, the industrial personal computer is often limited by development time. Therefore, when the industrial personal computer leaves the factory, the program code of the control unit is not very stable, further to cause the industrial personal computer to fail to be normally operated when the industrial personal computer executes certain application programs due to the defects of the program code of the control unit. At that moment, even if a user is to restart the industrial personal computer to solve the problem, the industrial personal computer may fail to be restarted as the program code of the control unit is changed.

BRIEF SUMMARY OF THE INVENTION

This invention provides a peripheral control module capable of being applied to an industrial computer system and ensuring the industrial computer system to be started successfully.

The invention provides a computer system capable of ensuring the computer system to successfully execute a startup program every time even when the computer system is shut down abnormally last time due to a control unit The invention provides an operation method of a computer system capable of ensuring the computer system to be successfully started and free from effect of a control unit.

The invention provides a peripheral control module for a computer system. The computer system includes a power switch capable of outputting a power signal. The peripheral control module includes a control unit and a control circuit. The control unit has a program code for controlling a peripheral module. In addition, the control circuit is coupled with the power switch and the control unit for receiving the power signal and outputting a switching signal to the control unit, and the control circuit resets the program code to an initial state before the control unit receives the switching signal.

The invention also provides a computer system including a power switch, a control unit, and a control circuit. The power switch is used for outputting a power signal. In addition, the control unit has a program code for controlling a peripheral module. The control circuit is coupled with the power switch and the control unit for receiving the power signal and outputting a switching signal to the control unit, and the control circuit resets the program code to an initial state before the control unit receives the switching signal.

In one embodiment of the invention, the control circuit may include control logic, a buffer, and a reset unit. The control logic outputs an enabling signal according to a state of the power signal. The buffer receives the power signal and the enabling signal, and then determines whether the switching signal is transmitted to the control unit according to the state of the power signal and a state of the enabling signal. In addition, the reset unit is coupled with the control unit and determines whether a reset signal is outputted according to a state of an output terminal of the buffer thus to reset the program code of the control unit to the initial state.

In one embodiment of the invention, the control circuit may further include a delay unit and an XNOR gate. The delay unit receives output of the buffer and outputs the output of the buffer to the XNOR gate after a predetermined delay time. Thereby, the XNOR gate respectively coupled with the delay unit and the control unit can output the switching signal to the control unit according to the state of the output of the delay unit and the state of the power signal.

The invention further provides an operation method of a computer system. The computer system includes a control unit for controlling operation of a peripheral module. The operation method is characterized that the program code of the control unit is reset to an initial state when the computer system is restarted every time.

This invention further provides an operation method of a computer system. The operation method in the invention is characterized that a program code of a control unit is reset to an initial state when the computer system is waken from a hibernation mode.

The invention further provides an operation method of a computer system. The computer system includes a power switch and a control unit. The control unit has a program code for controlling operation of a peripheral module. The operation method includes the following steps. First, a control circuit is provided, and the control circuit is coupled with the power switch and the control unit. Then, whether the power switch of the computer system is switched from a first state to a second state is determined. If the power switch is switched from the first state to the second state, the power switch outputs a power signal to the control circuit. Afterwards, the control circuit resets the program code of the control unit to an initial state. Finally, the control circuit outputs a switching signal to the control unit.

When the computer system in the invention is started every time, the program code of the control unit can be reset to the initial state. Therefore, the computer system can be free from effect of the last abnormal operation and can be started normally.

These and other features, aspects, and advantages of the present invention will become better understood with regard to the following description, appended claims, and accompanying drawings.

DETAILED DESCRIPTION OF THE INVENTION

Figure 1:
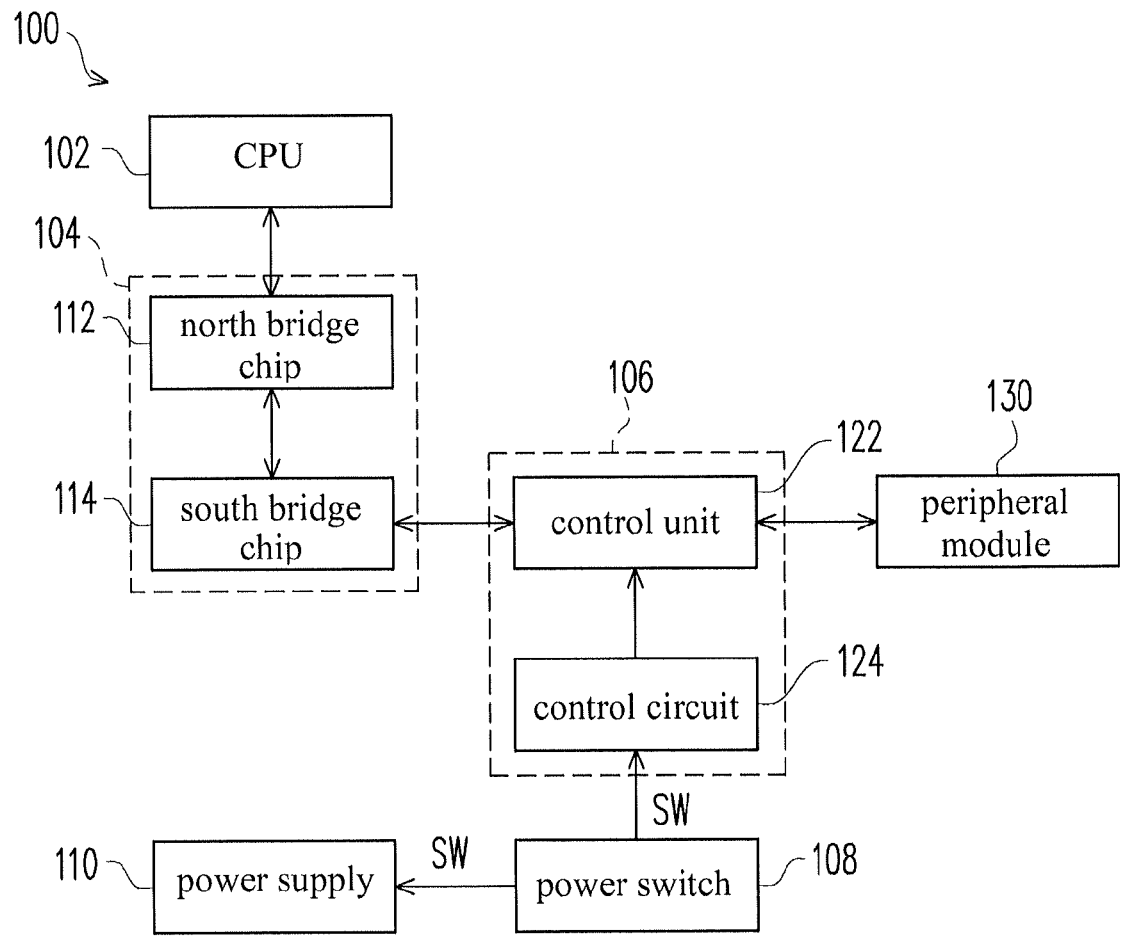
FIG. 1 is a block diagram showing a computer system according to one preferred embodiment of the invention.

FIG. 1 is a block diagram showing a computer system according to one preferred embodiment of the invention. In FIG. 1, a computer system 100 in the embodiment of the invention can be an industrial personal computer and include a central processing unit (CPU) 102, a chipset 104, a peripheral control module 106, a power switch 108, and a power supply 110. The chipset 104 can be coupled with the central processing unit 102 and the peripheral control module 106. In addition, the power switch 108 can be coupled with the peripheral control module 106 and the power supply 110.

The chipset 104 includes a north bridge chip 112 and a south bridge chip 114. The north bridge chip 112 can be coupled with the central processing unit 102, and the south bridge chip 114 can be coupled with the north bridge chip 112 and the peripheral control module 106.

The peripheral control module 106 can control operation of a peripheral module 130. The peripheral control module 106 can include a control unit 122 and a control circuit 124. The control unit 122 may be an embedded control chip, and it can be coupled with the peripheral module 130 and the control circuit 124. The control unit 122 has a program code for controlling the peripheral module 130. In detail, when the central processing unit 102 is to control the peripheral module 130, the central processing unit 102 can first load the program code from the control unit 122 and then execute the program code. Thereby, the central processing unit 102 can control the operation of the peripheral module 130. In addition, the control circuit 124 can be coupled with the power switch 108 and the control unit 122. The power switch 108 can output a power signal SW and determine a state of the power signal SW, and the power signal SW can be transmitted to the power supply 110 and the control circuit 124.

Figure 2:
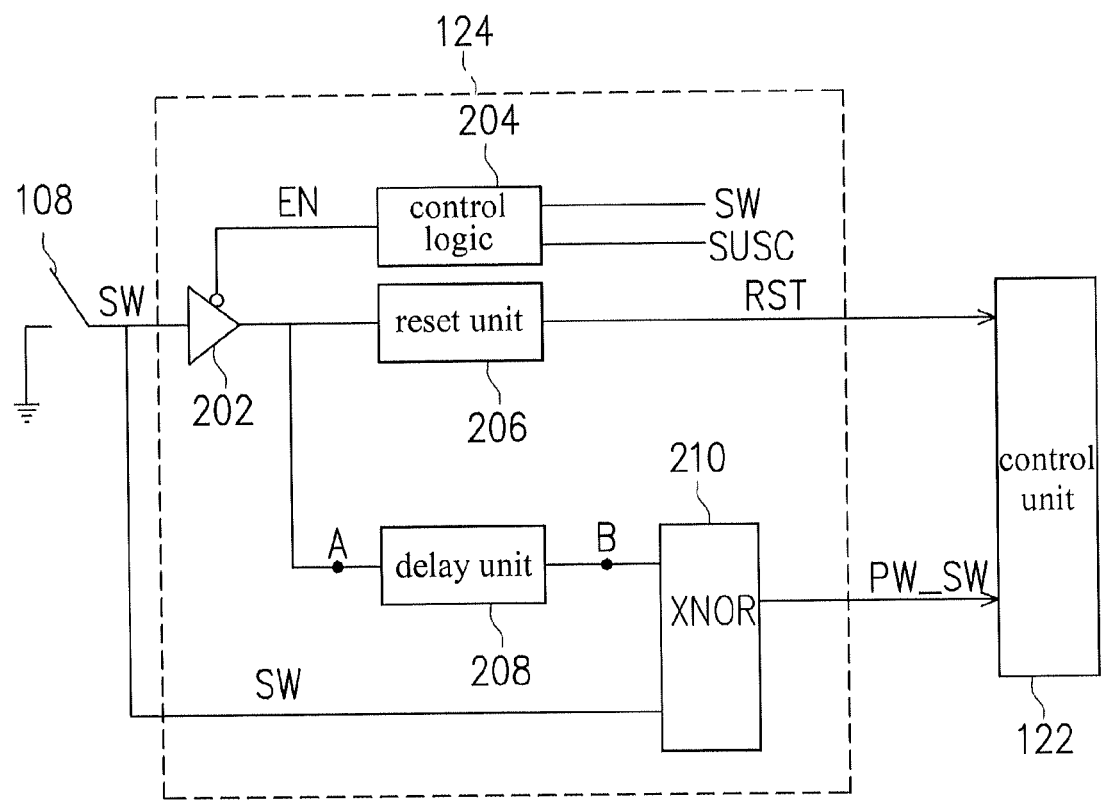
FIG. 2 is a circuit block diagram showing a control circuit according to one preferred embodiment of the invention.

FIG. 2 is a circuit block diagram showing the control circuit 124 according to one preferred embodiment of the invention. In FIG. 2, the control circuit 124 includes a buffer 202, control logic 204, a reset unit 206, a delay unit 208, and an XNOR gate 210. An input terminal of the buffer 202 is coupled with the power switch 108 and the XNOR gate 210, and an output terminal can be coupled with the reset unit 206 and the delay unit 208. In addition, the buffer 202 further has an enabling terminal capable of being coupled with the output of the control logic 204. In addition, the output of the reset unit 206 and the output of the XNOR gate 210 can be coupled with the control unit 122, respectively.

One terminal of the power switch 108 can be grounded, and the other terminal can be coupled with the input terminal of the buffer 202 and the power supply 110 in FIG. 1. Thereby, the buffer 202 can receive the power signal SW. In addition, the enabling terminal of the buffer 202 can receive an enabling signal EN outputted from the control logic 204. The control logic 204 determines a state of the enabling signal EN at least according to the state of the power signal SW. In the embodiment, the control logic 204 can determine the state of the enabling signal EN further according to a state of an operation signal SUSC.

In the embodiment, the buffer 202 can be enabled by a low level. When the computer system 100 is disabled, such as in the S5 (a soft off mode) or the S4 (a suspend to disk (STD) mode, that is, a hibernation mode) state, the control logic 204 can output the enabling signal EN in the low level to enable the buffer 202. On the other hand, when the computer system 100 is in other working states, such as in the S0 (a startup mode) or the S3 (a suspend to RAM (STR) mode, that is, a standby mode) state, the control logic 204 can allow the enabling signal EN to be in a high level according to the power signal SW and the operation signal SUSC thus to disable the buffer 202.

The reset unit 206 and the delay unit 208 are coupled with the output terminal of the buffer 202, respectively. The reset unit 206 can determine whether a reset signal RST is outputted to the control unit 122 according to a state of the output terminal of the buffer 202. The delay unit 208 can receive the output of the buffer 202, and it can transmit the output of the buffer 202 to the XNOR gate 210 after a predetermined delay time. The XNOR gate 210 receives the output of the delay unit 208 and the power signal SW, respectively. Thereby, the XNOR gate 210 can output a switching signal PW_SW to the control unit 122 according to the power signal SW and the output of the delay unit 208.

Figure 3:
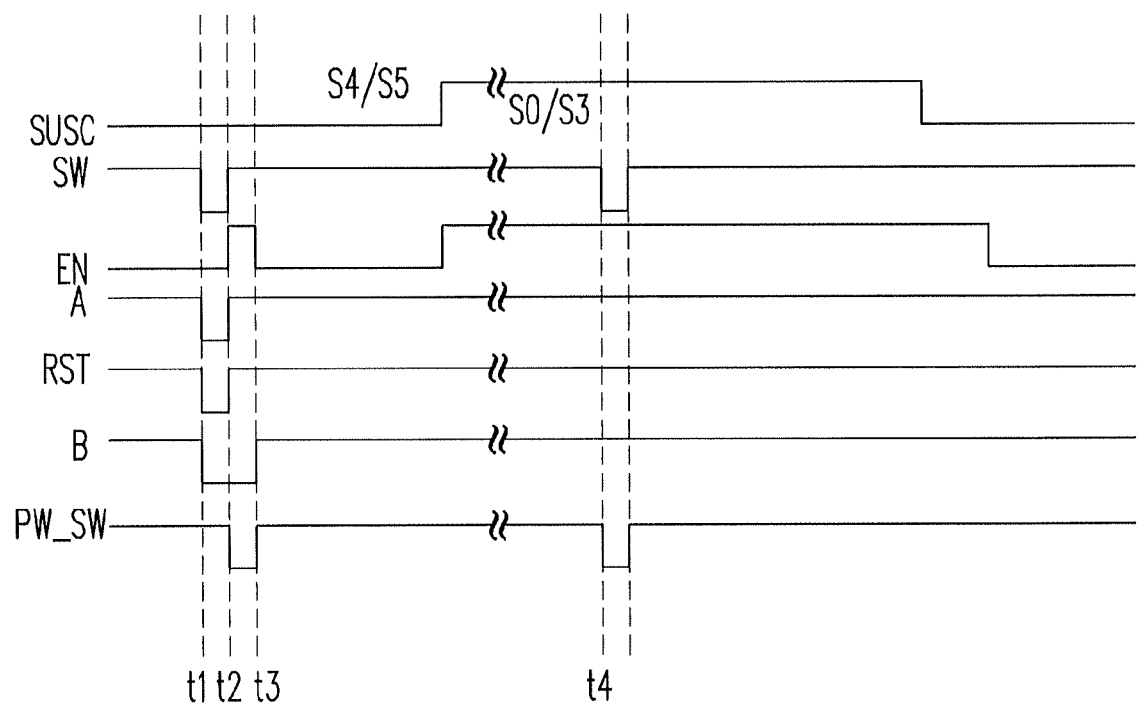
FIG. 3 is a time sequence diagram showing signals of the control circuit in FIG. 2 according to one preferred embodiment of the invention.

FIG. 3 is a time sequence diagram showing the signals of the control circuit 124 in FIG. 2 according to one preferred embodiment of the invention. Please refer to FIG. 2 and FIG. 3 together. Supposing that before time t1 the computer system 100 is in the S4 or S5 state, for example, when the computer system 100 is in the S4 state, the enabling signal EN is in the low level as described above. Therefore, the buffer 202 is enabled. At that moment, the control unit 122 is in a standby state and waiting for receiving signals transmitted from other units of the computer system 100 without performing any action.

Supposing that a user presses the power switch 108 at the time t1 to start up the computer system 100, the potential of the power signal SW may be pulled down to a ground level at that moment. Since the buffer 202 maintains to be enabled, the state of the output terminal of the buffer 202 is also in the low level. In the meanwhile the reset unit 206 detects that the state of the output terminal of the buffer 202 is in the low level, and it can output the reset signal RST in the low level to the control unit 122. Then, the control unit 122 receives the reset signal RST in the low level further to perform reset operation, to allow the program code of the control unit 122 to be reset to an initial state.

The delay unit 208 can delay width of a signal. Therefore, even the power signal SW is switched to a high level as the switch 108 returns to be an off state at the time t2, and a state of a node A is also switched to a high level, a state of a node B can still keep in the low level. At that moment, since the state of the node B and the state of the power signal SW are different with each other, the XNOR gate 210 can output the switching signal PW_SW in the low level to the control unit 122 after the XNOR gate 210 is reset by the control unit 122.

In another aspect, the power signal SW is in the low level between the time t1 and t2, and returns to the high level between the time t2 and t3, therefore, the control logic 204 can allow the enabling signal EN to be the high level between the time t2 and t3 thus to disable the buffer 202. Thereby, error operation of the computer system 100 caused by continuously pressing the switch 108 by a user can be avoided.

When the computer system 100 completes the startup program to normally work, that is, the computer system 100 is in the S0 state, the control logic 204 can pull up the enabling signal EN to the high level to disable the buffer 202. Afterwards, when the buffer 202 is disabled, if the power switch 108 is pressed by the user again (such as at time t4), at that moment, the output terminal of the buffer 202 can keep in the high level. Therefore, the reset unit 206 keeps the reset signal RST in the high level, and the control unit 122 does not perform the reset operation. In addition, the condition that the buffer 202 is disabled when the computer system 100 is in the S3 state is the same as that described above, and it is not limited to a specific embodiment.

In another aspect, when the power switch 108 is pressed at the time t4, the power signal SW may be pulled down to the ground level, such that the state of the node B and the state of the power signal SW are different with each other, further to cause the XNOR gate 210 to output the switching signal PW_SW in the low level to the control unit 122 again. When the control unit 122 receives the switching signal PW_SW in the low level when the buffer 202 is disabled, the buffer 202 can return to the enabling state, thereby waiting for the next startup or recovery from the standby mode (S3) of the computer system 100 to repeat the above actions.

To prevent mis-operation of the computer system 100 caused by mis-touch of the power switch 108 when the user operates the computer system 100, in one preferred embodiment, when the control unit 122 receives the switching signal PW_SW in the low level when the buffer 202 is disabled, the duration time is detected. If the duration time of the switching signal PW_SW in the low level does not reach predetermined time, the control unit 122 does not perform any action. On the other hand, if the time of the switching signal PW_SW in the low level reaches the predetermined time, the computer system 100 executes a shutdown program or enters into a hibernation mode. At that moment, the control unit 122 can return to the standby state.

Figure 4A:
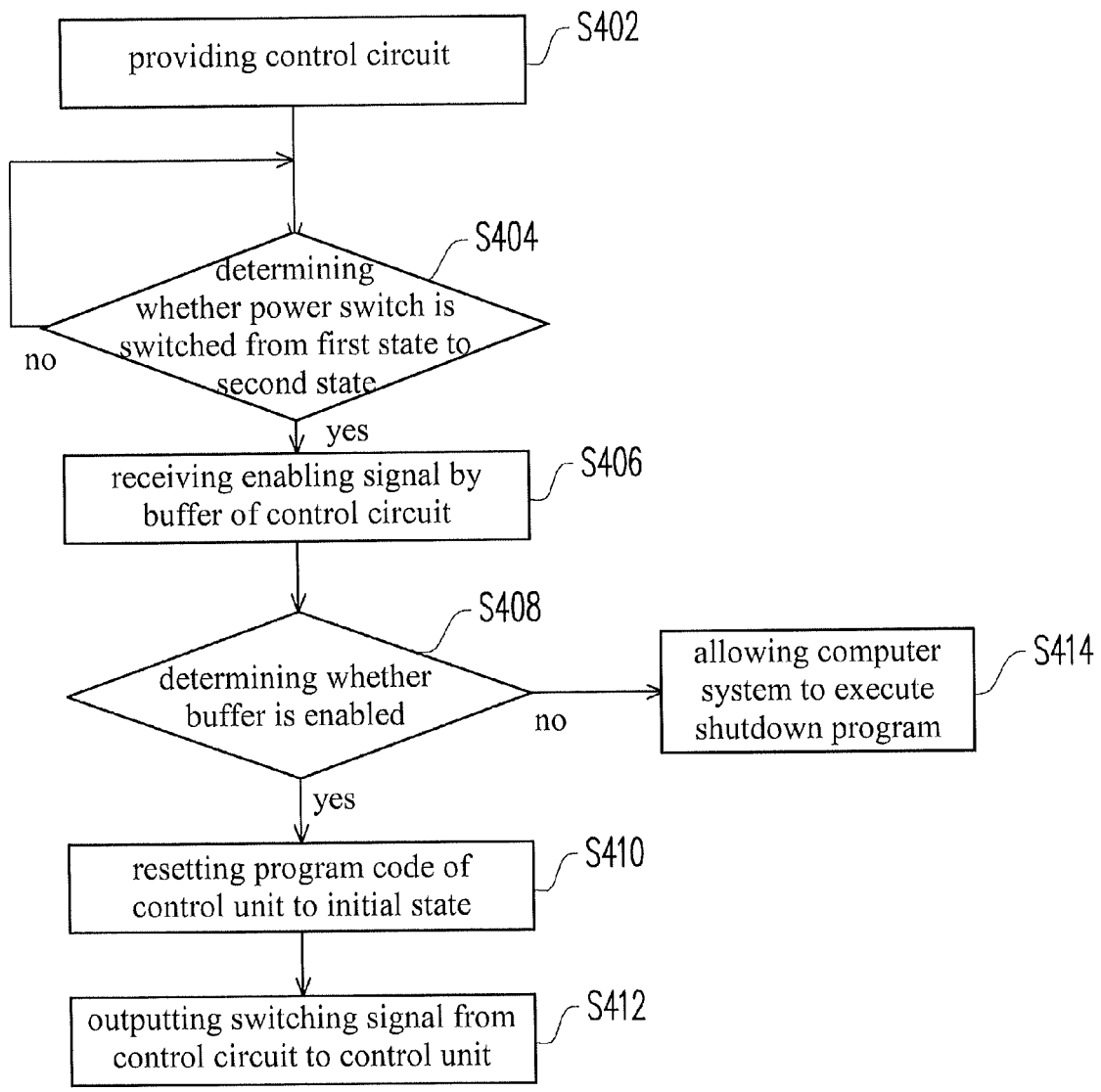
FIG. 4A is a flowchart showing an operation method of a computer system according to one preferred embodiment of the invention.

FIG. 4A is a flowchart showing an operation method of a computer system according to one preferred embodiment of the invention. Please referring to the embodiment in FIG. 4, the computer system includes a power switch and a control unit, and the control unit has a program code for controlling operation of a peripheral module. First, in step S402, a control circuit is provided, and the control circuit is coupled with the power switch and the control unit of the computer system. Then, in step S404, whether the power switch is switched from a first state to a second state is determined. When the power switch is switched from the first state to the second state (corresponding to yes marked in step S404), the power switch can output a power signal to the control circuit.

In the embodiment, the control circuit further includes a buffer. In step S406, the buffer can receive an enabling signal, and whether the buffer is enabled is determined according to a state of the enabling signal. Then, in step S408, whether the buffer is enabled is determined. When the buffer is enabled (corresponding to yes marked in step S408), in step S410, the control circuit resets the program code of the control unit to the initial state. How the control circuit resets the program code of the control unit to the initial state (for example, the control circuit transmits a reset signal to the control unit) is described above. Therefore, it is not described for a concise purpose. Finally, the control circuit outputs a switching signal to the control unit as described in step 412.

Relatively, in step S408, if the buffer is disabled (corresponding to no marked in step S408), the computer system is allowed to execute a shutdown program (step S414).

Figure 4B:
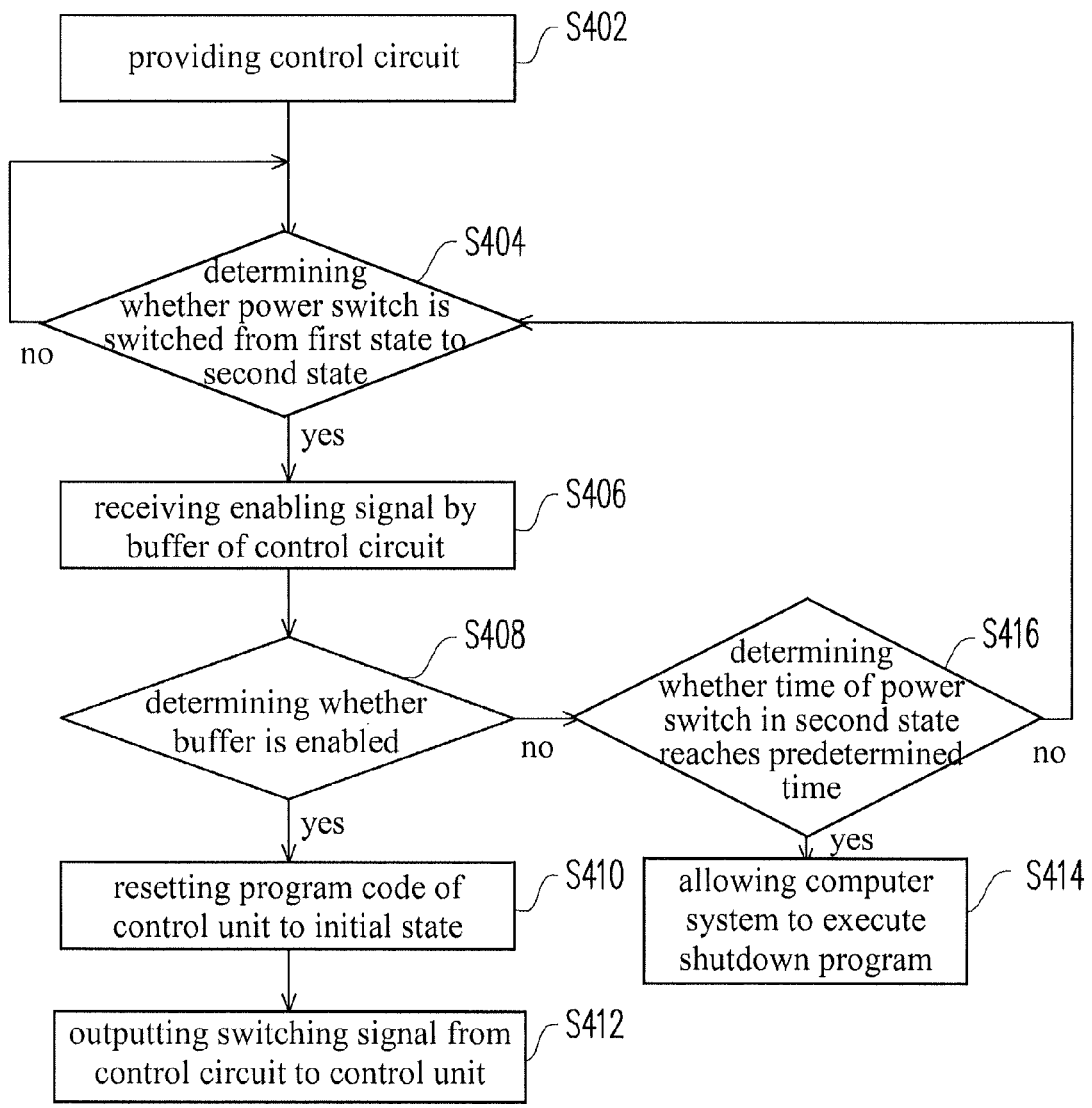
FIG. 4B is a flowchart showing an operation method of a computer system according to another preferred embodiment of the invention.

FIG. 4B is a flowchart showing an operation method of a computer system according to another embodiment of the invention. In FIG. 4B, the steps in this embodiment is about the same as that in the above embodiment. The difference is that in step S408, if the buffer is disabled, whether the time of the power switch in the second state reaches predetermined time is determined (step S416). If the duration time of the power switch in the second state does not reach the predetermined time (corresponding to no marked in step S416), the step S402 can be repeated. That is, switch from the first state to the second state of the power switch is waited for again. On the other hand, if the duration time of the power switch in the second state reaches the predetermined time (corresponding to yes marked in step S416), step S414 is performed.

To sum up, in the invention, before the control unit is switched from the disabling state from the enabling state every time, the program code of the control unit can be first reset to the initial state. Therefore, the abnormal shutdown of the computer system last time due to mis-operation does not affect startup operation of the computer system next time.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A peripheral control module for a computer system, the computer system including a power switch capable of outputting a power signal, the peripheral control module comprising:
   a control unit having a program code for controlling a peripheral module; and
   a control circuit coupled with the power switch and the control unit for receiving the power signal and outputting a switching signal to the control unit, the control circuit resetting the program code to an initial state before the control unit receives the switching signal, the control circuit comprising:
      a control logic outputting an enabling signal according to a state of the power signal;
      a buffer receiving the power signal and the enabling signal, and then determining whether the switching signal being transmitted to the control unit according to the state of the power signal and a state of the enabling signal; and a reset unit coupled with the control unit and determining whether a reset signal being outputted according to a state of an output terminal of the buffer thus to reset the program code of the control unit to the initial state.

2. The peripheral control module according to claim 1, wherein the control circuit further comprises:

a delay unit receiving output of the buffer and outputting the output of the buffer after a predetermined delay time; and an XNOR gate coupled with the delay unit and the control unit, respectively, and outputting the switching signal to the control unit according to the state of the output of the delay unit and the state of the power signal.

3. The peripheral control module according to claim 1, wherein after the program code is reset to the initial state, the enabling signal outputted from the control logic is switched from a first state to a second state, and the buffer is disabled.

4. The peripheral control module according to claim 1, wherein the computer system is an industrial personal computer.

5. A computer system comprising:

a power switch for outputting a power signal;

a control unit having a program code for controlling a peripheral module; and a control circuit coupled with the power switch and the control unit for receiving the power signal and outputting a switching signal to the control unit, the control circuit resetting the program code to an initial state before the control unit receives the switching signal, the control circuit comprising:

a control logic outputting an enabling signal according to a state of the power signal;

a buffer receiving the power signal and the enabling signal and determining whether the switching signal being transmitted to the control unit according to the state of the power signal and a state of the enabling signal; and a reset unit coupled with the control unit and determining whether a reset signal being outputted according to a state of an output terminal of the buffer thus to reset the program code of the control unit to the initial state.

6. The computer system according to claim 5, wherein the control circuit further comprises:

a delay unit receiving output of the buffer and outputting the output of the buffer after a predetermined delay time; and an XNOR gate coupled with the control unit and outputting the switching signal according to the state of the output of the delay unit and the state of the power signal.

7. The computer system according to claim 5, wherein the enabling signal outputted from the control logic is switched from a first state to a second state after the program code is reset to the initial state, and the buffer is disabled.

8. The computer system according to claim 5, further comprising:

a central processing unit; and a chipset coupled with the central processing unit and the control unit.

9. The computer system according to claim 8, wherein the chipset comprises:

a north bridge chip coupled with the central processing unit; and a south bridge chip coupled with the north bridge chip and the control unit.

10. The computer system according to claim 5, further comprising a power supply coupled with the power switch and determining whether to supply power needed by operation for the computer system according to a state of the power signal.

11. An operation method of a computer system, the computer system including a power switch and a control unit, the control unit having a program code for controlling operation of a peripheral module, the operation method comprising the following steps of:

providing a control circuit, the control circuit comprising a buffer and being coupled with the power switch and the control unit;

determining whether the power switch of the computer system is switched from a first state to a second state, if the power switch is switched from the first state to the second state, outputting a power signal to the control circuit by the power switch;

receiving an enabling signal by the buffer;

determining whether the buffer is enabled;

resetting the program code of the control unit to an initial state by the control circuit if the buffer is enabled; and outputting a switching signal to the control unit by the control circuit.

12. The operation method according to claim 11, wherein in the step of determining whether the buffer is enabled, if the buffer is not enabled, the operation method comprises the following step of:

allowing the computer system to execute a shutdown program.

13. The operation method according to claim 11, wherein in the step of determining whether the buffer is enabled, if the buffer is not enabled, the operation method comprises the following step of:

determining whether time of the power switch in the second state reaches a predetermined time, if the time of the power switch in the second state reaches the predetermined time, allowing the computer system to execute a shutdown program.

* * * * *